(12) United States Patent
Kim

(10) Patent No.: US 8,733,520 B2
(45) Date of Patent: May 27, 2014

(54) IMPACT SENSITIVE DAMPER

(75) Inventor: Hong Sig Kim, Jeonbuk (KR)

(73) Assignee: Mando Corporation, Pyeongtaek-Si (KR)

( * ) Notice: Subject to any disclaimer, the term of this patent is extended or adjusted under 35 U.S.C. 154(b) by 0 days.

(21) Appl. No.: 13/152,941

(22) Filed: Jun. 3, 2011

(65) Prior Publication Data

US 2011/0297497 A1   Dec. 8, 2011

(30) Foreign Application Priority Data

Jun. 4, 2010   (KR) .......................... 10-2010-0052725

(51) Int. Cl.
*F16F 9/36*   (2006.01)

(52) U.S. Cl.
USPC ..................................... 188/322.14; 188/280

(58) Field of Classification Search
USPC .............. 188/322.14, 322.15; 137/493.8, 854
See application file for complete search history.

(56) References Cited

U.S. PATENT DOCUMENTS

| | | | | |
|---|---|---|---|---|
| 4,076,276 A | * | 2/1978 | Wijnhoven et al. | 267/64.11 |
| 4,083,437 A | * | 4/1978 | Leppich | 188/322.14 |
| 4,109,767 A | * | 8/1978 | Nandyal et al. | 188/315 |
| 4,602,707 A | * | 7/1986 | Zumwinkel et al. | 188/315 |
| 4,823,922 A | * | 4/1989 | Ergun | 188/282.8 |
| 4,830,152 A | * | 5/1989 | Rauert et al. | 188/322.15 |
| 5,992,585 A | * | 11/1999 | Kazmirski et al. | 188/322.14 |
| 6,290,035 B1 | * | 9/2001 | Kazmirski et al. | 188/322.14 |
| 6,422,361 B2 | * | 7/2002 | Naples et al. | 188/322.15 |
| 6,651,788 B1 | * | 11/2003 | Wohlfarth | 188/322.14 |
| 2002/0189914 A1 | | 12/2002 | Naples et al. | |
| 2003/0051957 A1 | * | 3/2003 | Lemieux | 188/322.15 |
| 2009/0107782 A1 | | 4/2009 | Ota et al. | |

FOREIGN PATENT DOCUMENTS

JP   2007-132389 A   5/2007

* cited by examiner

*Primary Examiner* — Bradley King
(74) *Attorney, Agent, or Firm* — McDermott Will & Emery LLP

(57) ABSTRACT

Disclosed herein is an impact sensitive damper damping vibration transferred from a road surface to a vehicle, and more particularly, to an impact sensitive damper in which handling stability may be achieved in a low speed operating section of the damper and improvement of ride comfort may be achieved in a high speed operating section thereof. According to an exemplary embodiment of the present invention, there is provided an impact sensitive damper improving ride comfort by decreasing damping force when impact is applied to a vehicle, the impact sensitive damper including: a body valve body having compression channels and expansion channels formed therein; a fastener vertically penetrating through the body valve body; a dish shaped spring interposed between an upper portion of the body valve body and the fastener; and a disk shaped spring interposed between a lower portion of the body valve body and the fastener, wherein at the time of compression stroke when the impact is applied to the damper, the fastener is relatively displaced with respect to the body valve body due to elastic deformation of the dish shaped spring, such that the disk shaped spring and the lower portion of the body valve body are spaced apart from each other, thereby increasing a channel area of operating fluid.

4 Claims, 4 Drawing Sheets

IMPACT SENSITIVE DAMPER

This application claims priority from and the benefit of Korean Patent Application No. 10-2010-0052725, filed on Jun. 4, 2010, which is hereby incorporated by reference for all purposes as if fully set forth herein.

BACKGROUND

1. Technical Field

The present invention relates to an impact sensitive damper damping vibration transferred from a road surface to a vehicle, and more particularly, to an impact sensitive damper in which handling stability may be achieved in a low speed operating section of the damper and improvement of ride comfort may be achieved in a high speed operating section thereof.

2. Description of the Related Art

Generally, since vibration or impact is continuously applied from a road surface through wheels during driving of a vehicle, a damping device is installed between a car body and a car axis to prevent the impact or the vibration from being directly transferred to the car body, thereby improving ride comfort and to suppress irregular vibration of the car body, thereby improving handling stability.

Here, a connection device between the car body and the car axis, including this damping device is collectively referred to as a suspension device. The suspension device is configured to include a chassis spring alleviating impact, a damper controlling free vibration of the chassis spring to thereby improve ride comfort, a stabilizer preventing rolling, a rubber bushing, a control arm, and the like.

Among other components of the suspension device, the damper serves to suppress and damp vibration from a road surface and is mounted between the car body or a frame and a wheel. Particularly, the damper absorbs vertical vibrational energy of the car body to suppress the vibration, improve the ride comfort, protect loaded freight, and decrease dynamic stress of each part of the car body, thereby increasing durability. In addition, the damper suppresses downward movement of a spring to secure ground properties of a tire and suppresses a change in posture due to inertial force to improve movement performance of a vehicle.

The ride comfort and the handling stability may be appropriately adjusted according to damping force characteristics of the damper. That is, the damping force needs to be small in order to improve the ride comfort during general driving of the vehicle and the damping force needs to be large in order to improve the handling stability at the time of quick turning of the vehicle or during high speed driving thereof.

FIG. 1 is a cross-sectional view showing a general damper according to the related art.

The damper 40 includes a cylinder 43 having operating fluid filled therein, a piston rod 49 having one end positioned inside the cylinder and the other end positioned outside of the cylinder, and a piston valve 47 mounted on one end of the piston rod 49 to thereby reciprocate within the cylinder 43. The cylinder 43 is configured of an inner pipe 41 and an outer pipe 42 and has a body valve 48 mounted in a position facing the piston valve 47 at a distal end thereof.

An inner portion of the cylinder is divided into a compression chamber 52 and an expansion chamber 51 by the piston valve 47, and the inner pipe 41 and the outer pipe 42 have a storing room 46 formed therebetween.

FIG. 2 is a cross-sectional view of a body valve for describing generation of damping force of a damper.

As shown in FIG. 2, the body valve 48 includes compression channels 61a and expansion channels 61b vertically formed in a body valve body 61 and a suction valve assembly 66 mounted on an upper portion of the body valve body 61, wherein the compression channels 61a and the expansion channels 61b allow the compression chamber 52 and the storing room 46 to be in communication with each other and the suction valve opens/closes the compression channels 61a.

The suction valve assembly 66 includes slots 62a and a single-plate suction valve 62 that are formed at the upper portion of the body valve body 61 and a retainer 63, a suction spring 64, and a washer 65 that are sequentially stacked on the slots and the suction valve, wherein the slots are in communication with the compression channels 61a, the suction value 62 opens/closes the expansion channels 61b, and the washer 65 supports the retainer 63 and the suction spring 64.

Here, the retainer 63 maintains a clearance, the suction spring 64 elastically supports a rear surface of the suction valve 62 at an upper portion of the retainer 63 and always closely adheres the suction valve 62 to an upper surface of the body valve body 61, and the washer 65 having holes 65a formed therein is mounted on an upper portion of the suction spring 64. The body valve body 61 includes a multi-plate disk 68 mounted on a lower portion thereof, wherein the multi-plate disk 68 opens/closes the compression channels 61a.

At the time of the compression stroke of the piston rod 49, operating fluid of the compression chamber 52 passes through the holes 65a of the washer 65, the slots 62a of the suction valve 62 and the compression channels 61a and then pushes the multi-plate disk 68 downwardly to move toward the storing room 46 while opening the multi-plate disk 68, thereby generating the damping force. At the time of the expansion stroke thereof, the operating fluid in the storing room 46 passes through the extension channels 61b and then pushes the suction valve 62 upwardly to move to the compression chamber 52 while opening the suction valve 62, thereby generating the damping force.

However, in the case of the body valve 48 according to the related art using the above-mentioned multi-plate disk 68, as a load applied to the multi-plate disk 68 increases, a deformation amount rapidly decreases. Therefore, when large impact is transferred to the damper, a limitation in deformation of the multi-plate disk 68 occurs, such that the damping force rapidly increases, thereby deteriorating the ride comfort.

BRIEF SUMMARY

The present invention has been made in an effort to provide an impact sensitive damper in which both of a dish shaped spring and a disk shaped spring are used in a body valve of the damper to achieve smooth improvement of damping force at the time of conversion from a low speed operating section of the damper into a high speed operating section thereof, such that handling stability and improvement of ride comfort may be simultaneously achieved.

According to an exemplary embodiment of the present invention, there is provided an impact sensitive damper improving ride comfort by decreasing damping force when impact is applied to a vehicle, the impact sensitive damper including: a body valve body having compression channels and expansion channels formed therein; a fastener vertically penetrating through the body valve body; a dish shaped spring interposed between an upper portion of the body valve body and the fastener; and a disk shaped spring interposed between a lower portion of the body valve body and the fastener, wherein at the time of compression stroke when the impact is applied to the damper, the fastener is relatively displaced with respect to the body valve body due to elastic deformation of the dish shaped spring, such that the disk shaped spring and the lower portion of the body valve body are spaced apart from each other, thereby increasing a channel area of operating fluid.

The dish shaped spring may be fixedly mounted by a spring sheet interposed between the body valve body and the dish shaped spring.

The dish shaped spring, the spring sheet, the body valve body, and the disk shaped spring may be integrally assembled by the fastener.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, an impact sensitive damper according to an exemplary embodiment of the present invention will be described in detail with reference to the accompanying drawings. Damping force may be generated in a damper at the time of both of expansion stroke and compression stroke. However, since the present invention relates to the damping force at the time of the compression stroke, a body valve having an influence on generation of the damping force at the time of the compression stroke will be mainly described.

Figure 1:
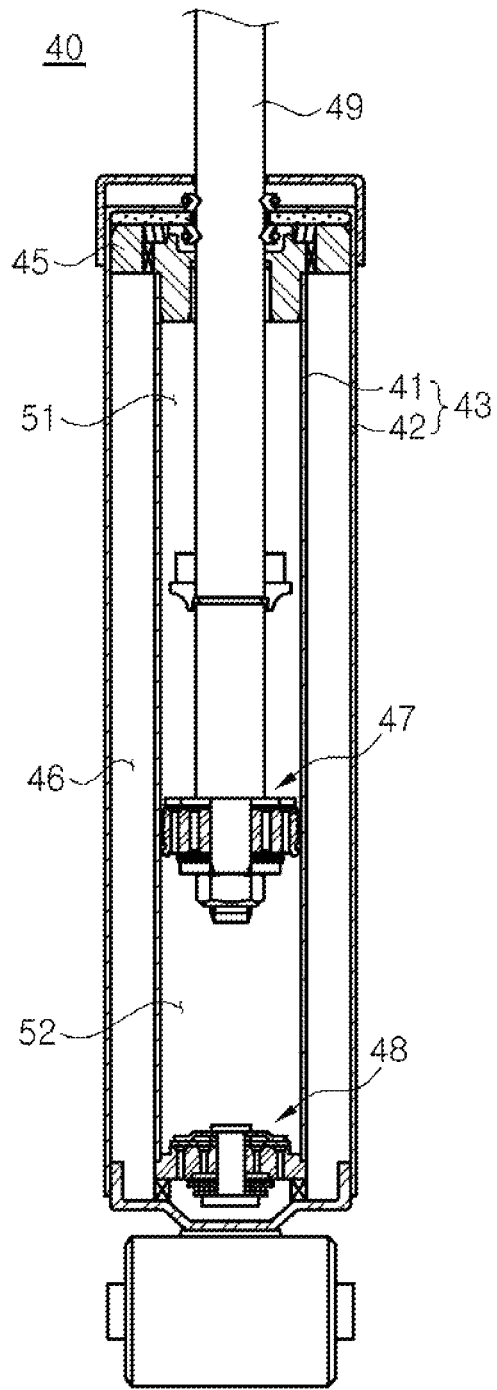
FIG. 1 is a cross-sectional view of the damper according to the related art.
Figure 2:
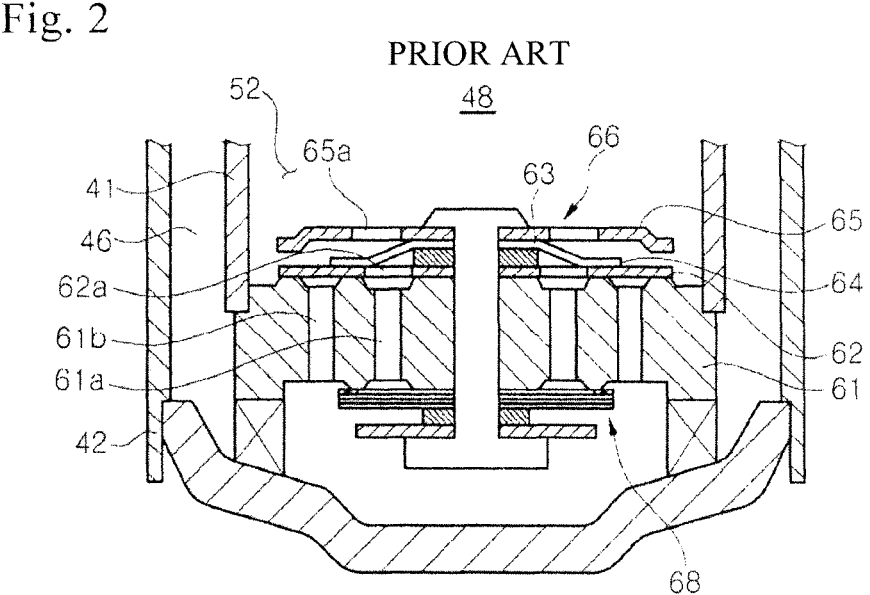
FIG. 2 is a cross-sectional view of a body valve of the damper according to the related art.
Figure 3:
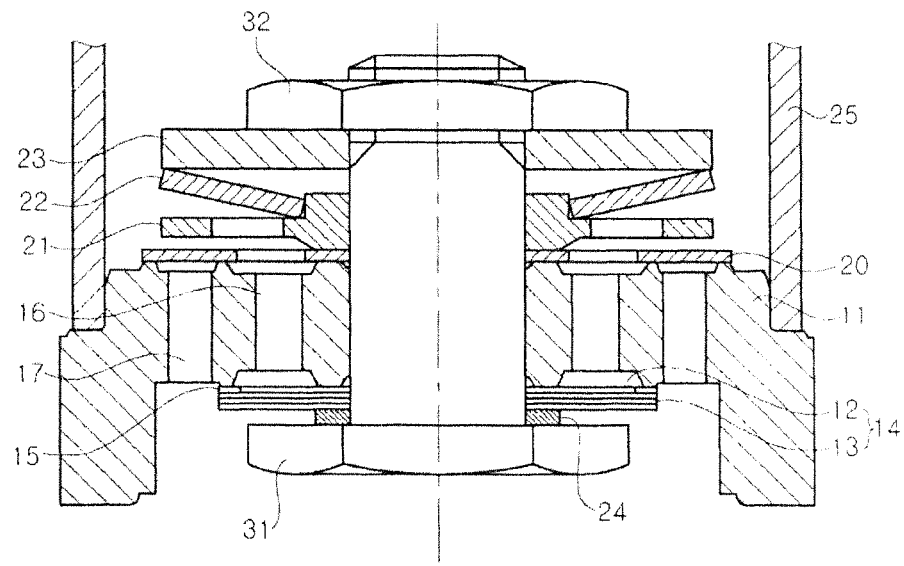
FIG. 3 is a cross-sectional view of a body valve assembly of an impact sensitive valve according to the prevent invention.

A cross-sectional view of a body valve assembly of an impact sensitive valve according to the prevent invention is shown in FIG. 3.

As shown in FIG. 3, an impact sensitive damper according to the prevent invention includes a cylindrical cylinder 25 having operating fluid filled therein and a body valve body 11 mounted in the cylinder 25 and having compression channels 16 and expansion channels 17 formed therein, having a predetermined interval therebetween. A bolt 31 may be fastened to a nut 32 while vertically penetrating through the body valve body 11. Although an exemplary embodiment of the present invention describes a case in which the bolt 31 and the nut 32 are used as a fastener, other members such as a rivet, or the like, may be used as long as they may perform fastening.

The body valve body 11 includes a suction valve 20 mounted on an upper surface thereof and a spring sheet 21 and a dish shaped spring 22 sequentially stacked on the suction valve 20. The spring sheet 21 is interposed between the suction valve 20 and the dish shaped spring 22. The spring sheet 21 has a first surface abutting a surface of the suction valve 20 and a second surface facing and spaced apart from the surface of the suction valve 20. In this configuration, the dish shaped spring 22 may maintain its position in a state in which it presses a washer 23 disposed on a lower surface of the nut 32. Therefore, when the damper is operated in a low speed operating section in which pressure according to a flow of the operating fluid smaller than pressing force of the dish shaped spring 22 occurs, a position of a fastener by which the bolt 31 and the nut 32 are fastened to each other does not change.

However, when large impact is applied from a road surface to the damper, such that the damper is operated in a high speed operating section, pressure of the operating fluid instantaneously increases. This pressure is larger than the pressing force of the dish shaped spring 22, such that deformation of the dish shaped spring 22 is generated. When the dish shaped spring 22 is pushed, the fastener by which the bolt 31 and the nut 32 are fastened to each other may be relatively displaced downwardly with respect to the body valve body 11.

The high speed operation or the low speed operation of the damper in the present description is associated with an operating speed of a piston rod (not shown) included in the damper. Generally, when large impact is applied from a road surface to the damper during driving of a vehicle, the damper is operated at a high speed.

The body valve body 11 includes a disk shaped spring 14 mounted on a lower surface thereof. The disk shaped spring 14 includes a disk-S 12 and a plurality of disks 13. In addition, a retainer 24 is mounted on a lower surface of the disk shaped spring 14. The retainer 24 may serve to maintain a position of the disk shaped spring 14 even when the disk shaped spring 14 is bent downwardly by pressure of the operating fluid. A slit 15 is formed at an edge of the disk-S 12, such that the operating fluid may flow through the slit 15 in the low speed operating section of the damper in which a flow of the operating fluid is weak, thereby generating damping force.

The body valve body 11 includes the suction valve 20 mounted on the upper surface thereof so as to close the expansion channel 17. At the time of the compression stroke of the damper, the suction valve 20 closes the expansion channel 17, such that the operating fluid flows through the compression channel 16. At the time of the expansion stroke of the damper, the suction valve 20 closing the expansion channel 17 is opened upwardly, such that the operating fluid flows through the expansion channel 17.

Although the flow of the operating fluid at the time of the expansion stroke is not shown in FIG. 3, at the time of the expansion stroke, the suction valve 20 is opened upwardly, such that the operating fluid may flow upwardly through the expansion channels 17 disposed at sides of the compression channels 16 based on FIG. 3.

The impact sensitive damper according to the present invention may adjust the damping force by using different characteristics of the disk shaped spring 14 and the dish shaped spring 22. When viewing a curve of FIG. 6 in which deformation amounts according to loads of the dish shaped spring 22 and the disk shaped spring 14 according to the present invention are compared to each other, in the case of the disk shaped spring 14, a displaceable amount increasingly decreases as the applied load increases. Therefore, when large impact is applied to the damper, the damping force rapidly increases. On the other hand, in the case of the dish shaped spring 22, a displaceable amount increasingly increases as the applied load increases. Therefore, when large impact is applied to the damper, the rapid increase in the damping force may be prevented.

More specifically, when the pressure of the operating fluid smaller than force with which the dish shaped spring 22 presses the washer 23 is transferred to the body valve assembly, the disk shaped spring 14 may be deformed before the dish shaped spring 22 is deformed. A small space is formed between the body valve body 11 and the disk shaped spring 14 due to the deformation of the disk shaped spring 14. When the operating fluid flows in the space, high damping force is generated, such that handling stability may be improved.

Figure 6:
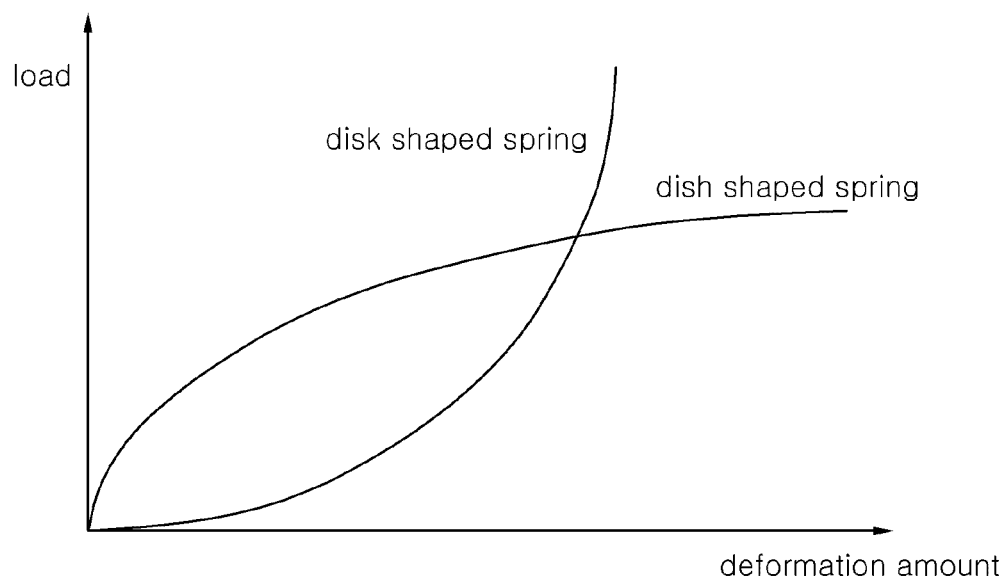
FIG. 6 is a curve in which deformation amounts according to loads of a dish shaped spring and a disk shaped spring according to the present invention are compared to each other.

However, when the large impact is applied to the damper, that is, when the pressure of the operating fluid larger than the force with which the dish shaped spring 22 presses the washer 23 is transferred to the body valve assembly, the disk shaped spring 14 may be no longer deformed as seen in FIG. 6, such that deformation of the dish shaped spring 22 is generated. The fastener by which the bolt 31 and the nut 32 are fastened to each other is relatively displaced downwardly with respect to the body valve body 11 due to the deformation of dish shaped spring 22 to form a space between the disk shaped spring 14 and a lower surface of the body valve body 11, such that a channel area of the operating fluid may increase. Since the channel area increases, an increase amount in the damping force becomes smooth, such that the ride comfort may be improved.

If the damping force is generated only by the disk shaped spring 14 without the dish shaped spring 22 at the time of the compression stroke, when the large impact is applied to the vehicle, the damping force rapidly increases, such that the ride comfort may be deteriorated. However, in the present invention, since the damping force is generated using both of the dish shaped spring 22 and the disk shaped spring 14 at the time of the compression stroke, even though the operation of the damper changes from a low speed section to a high speed section, the damping force smoothly increases, such that the ride comfort may be improved.

Hereinafter, an operation of the impact sensitive damper according to the present invention configured as described above will be described in connection with the generation of the damping force at the time of the compression stroke.

Figure 4:
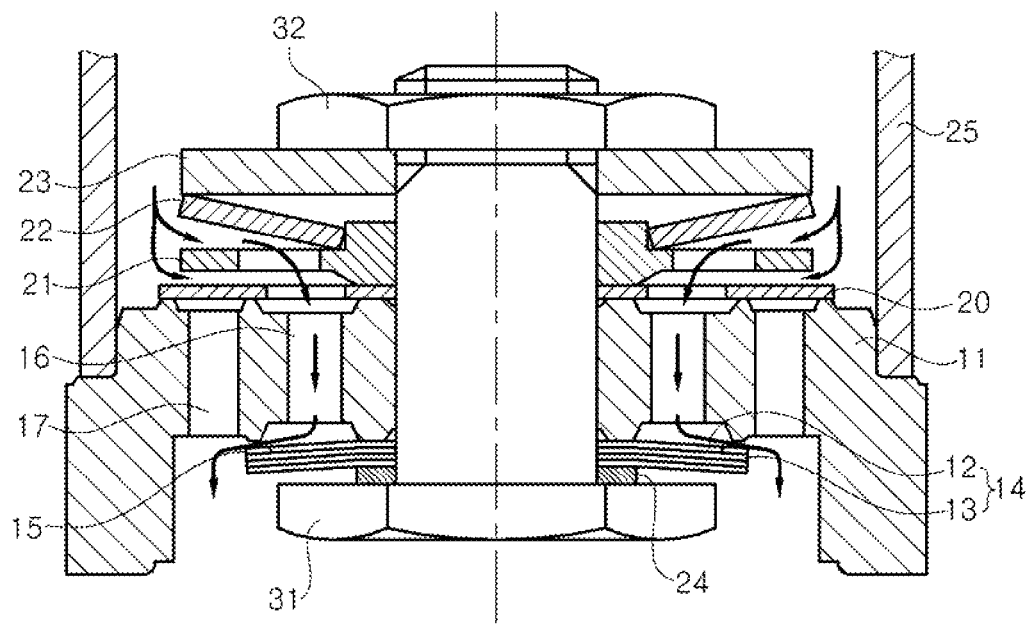
FIG. 4 is a state view showing a flow of operating fluid formed in a body valve assembly of a damper at a low speed.
Figure 5:
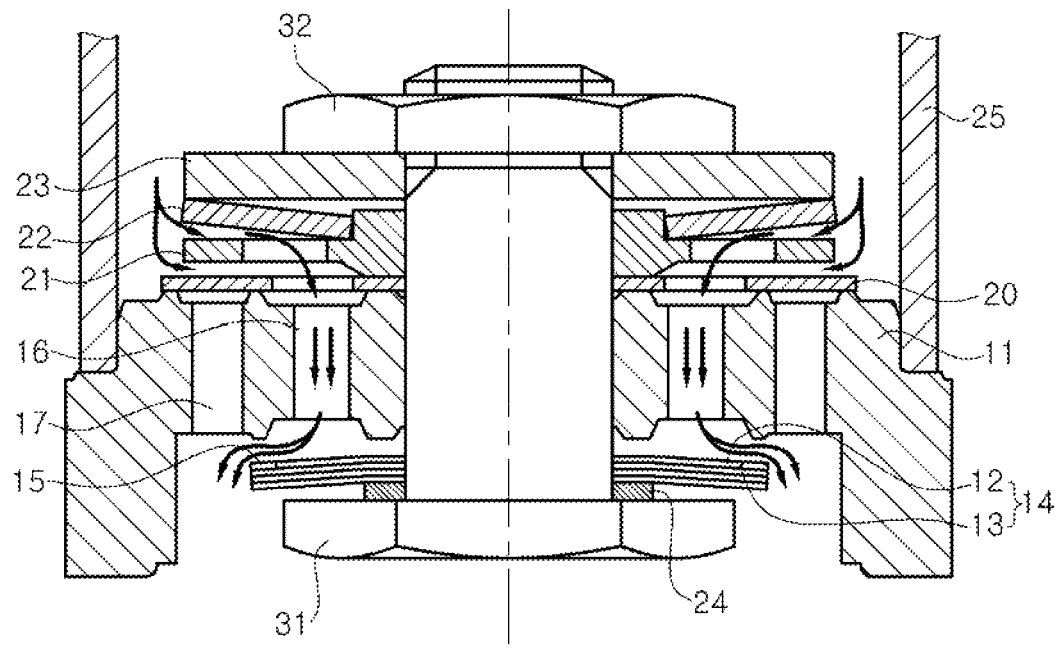
FIG. 5 is a state view showing a flow of operating fluid formed in a body valve assembly of a damper at a high speed.

A state view showing a flow of operating fluid formed in a body valve assembly of a damper at a low speed is shown in FIG. 4; and a state view showing a flow of operating fluid formed in a body valve assembly of a damper at a high speed is shown in FIG. 5.

As shown in FIG. 4, in a low speed operating section of the damper, the operating fluid passes through the compression channel 16 of the body valve body 11 and then flows through the slit 15 of the disk shaped spring 14.

In the low speed operating section, the dish shaped spring 22 is not deformed and the disk shaped spring 14 may be slowly deformed. That is, the operating fluid flowing through the slit 15 at the beginning may flow in a space formed between the disk shaped spring 14 and the body valve body 11 as the disk shaped spring 14 is gradually deformed.

Here, it needs to be noted that the space formed between the disk shaped spring 14 and the body valve body 11 due to the deformation of the disk shaped spring 14 is significantly smaller than a space formed between the disk shaped spring 14 and the body valve body 11 due to relative displacement of the fastener in the high speed operating section of the damper and there is a large difference in the area in which the operating fluid may flow.

As shown in FIG. 5, in a high speed operating section of the damper, the operating fluid flows in a space formed between the disk shaped spring 14 and the body valve body 11, such that a channel area may significantly increase, as compared to the low speed operating section of the damper.

A case in which the damper is in the high speed operating section indicates a case in which when the large impact is applied to the damper, pressure generated due to the flow of the operation fluid is larger than the force with which the dish shaped spring 22 presses the washer 23. Here, when the dish shaped spring 22 comes down, the fastener by which the bolt 31 and the nut 32 are fastened to each other may be relatively displaced downwardly with respect to the body valve body 11. Therefore, a space may be formed between the disk shaped spring 14 and the body valve body 11.

Since a deformation amount of the disk shaped spring 14 is relatively smaller in the high speed operating section than in the low speed operating section, there is a risk that the damping force rapidly increases. However, when the dish shaped spring 22 is deformed to thereby relatively displace the fastener by which the bolt 31 and the nut 32 are fastened to each other with respect to the body valve body 11, the channel area increases, such that an increase in the damping force significantly decreases.

With the impact sensitive damper according to the present invention as described above, when the damper is operated in the low speed operating section, the handling stability may increase, and when the large impact is instantaneously applied to the damper to thereby operate the damper in the high speed operating section, the damping force smoothly increases, such that the ride comfort may be improved.

In addition, the impact sensitive damper according to the present invention may be manufactured without significantly changing a structure of the damper according to the related art, such that a process of manufacturing the damper according to the related art may be used as it is.

With the present invention as described above, it is possible to provide the impact sensitive damper in which both of the dish-shaped spring and the disk-shaped spring are used in the body valve of the damper to achieve smooth improvement of the damping force at the time of conversion from the low speed operating section of the damper into the high speed operating section thereof, such that the handling stability and the improvement of ride comfort may be simultaneously achieved.

Therefore, with the present invention, the improvement of the handling stability may be achieved due to high damping force characteristics in the low speed operating section of the damper and the improvement of the ride comfort may be achieved due to low damping force characteristics in the high speed operating section of the damper.

The impact sensitive damper according to the present invention has been described with reference to the exemplary embodiment of the present invention. However, the present invention is not limited to the above-mentioned exemplary embodiment and drawings but may be variously modified and changed within the following claims by those skilled in the art to which the present invention pertains.

The invention claimed is:

1. An impact sensitive damper for improving ride comfort by decreasing damping force when an impact is applied to a vehicle and an operating fluid flows into the damper, the impact sensitive damper comprising:
    a body valve body having compression channels and expansion channels formed therein;
    a fastener vertically penetrating through the body valve body;
    a washer disposed on a surface of the fastener;
    a first dish shaped spring interposed between an upper portion of the body valve body and the fastener;
    a suction valve disposed on an upper surface of the body valve body;
    a spring sheet interposed between the suction valve and the first dish shaped spring, the spring sheet having a first surface abutting a surface of the suction valve and a second surface facing and spaced apart from said surface of the suction valve; and a second disk shaped spring interposed between a lower portion of the body valve body and the fastener, wherein:

the first dish shaped spring is disposed on the spring sheet and configured to press the washer such that the first dish shaped spring has a slope, relative to the spring sheet, downwards to the fastener, and at the time of a compression stroke when the impact is applied to the damper, when a force caused by a pressure of the operating fluid is larger than a force of the first dish shaped spring pressing the washer, the fastener is relatively displaced with respect to the body valve body due to an elastic deformation of the first dish shaped spring, such that the second disk shaped spring and the lower portion of the body valve body are spaced apart from each other, thereby increasing a channel area of operating fluid.

2. The impact sensitive damper of claim 1, wherein the first dish shaped spring, the spring sheet, the body valve body, and the second disk shaped spring are assembled by the fastener.

3. The impact sensitive damper of claim 1, wherein:

when the first dish shaped spring is not deformed, the second disk shaped spring is configured to be deformed to form a space between the second disk shaped spring and the body valve body such that the operating fluid flows in the formed space.

4. The impact sensitive damper of claim 1, wherein:

when the pressure of the operating fluid is larger than the force of the first dish shaped spring pressing the washer, the first dish shaped spring is configured to be deformed form a first space between the first disk shaped spring and the body valve body, and the relative displacement of the fastener forms a second space between the second disk shaped spring and the body valve body, and the first space is smaller than the second space.

* * * * *